United States Patent
Akkermans et al.

(10) Patent No.: US 7,349,296 B2
(45) Date of Patent: Mar. 25, 2008

(54) WRITE CONTROL IN RESPONSE TO TRACKING ERROR

(75) Inventors: Antonius Hermanus Maria Akkermans, Eindhoven (NL); Johannes Joseph Albertus Raaijmakers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 430 days.

(21) Appl. No.: 10/482,879

(22) PCT Filed: Jun. 20, 2002

(86) PCT No.: PCT/IB02/02387

§ 371 (c)(1), (2), (4) Date: Jan. 6, 2004

(87) PCT Pub. No.: WO03/007294

PCT Pub. Date: Jan. 23, 2003

(65) Prior Publication Data

US 2004/0240337 A1 Dec. 2, 2004

(30) Foreign Application Priority Data

Jul. 9, 2001 (EP) .................................. 01202630

(51) Int. Cl.
*G11B 7/09* (2006.01)

(52) U.S. Cl. .................................. 369/44.25; 369/30.18
(58) Field of Classification Search ............. 369/44.25, 369/44.27, 53.28, 53.37, 47.11
See application file for complete search history.

(56) References Cited

U.S. PATENT DOCUMENTS

| 4,390,942 | A | * | 6/1983 | de Keizer | ..................... 700/42 |
| 4,554,652 | A | * | 11/1985 | Maeda et al. | ............. 369/44.33 |
| 4,677,603 | A | * | 6/1987 | Kenjyo | ..................... 369/30.15 |
| 4,730,290 | A | * | 3/1988 | Takasago et al. | ........ 369/30.21 |
| 4,956,832 | A | * | 9/1990 | Miyasaka | ................. 369/44.11 |
| 5,056,074 | A | * | 10/1991 | Tateishi et al. | ........... 369/44.28 |
| 5,115,421 | A | * | 5/1992 | Rokutan | .................. 369/44.33 |
| 5,420,838 | A | * | 5/1995 | Maeda et al. | ............. 369/47.14 |
| 5,737,481 | A | * | 4/1998 | Gushima et al. | ............ 386/113 |

(Continued)

FOREIGN PATENT DOCUMENTS

EP 0326343 A * 2/1989

(Continued)

OTHER PUBLICATIONS

Official Translation of JP 63-061423.*

*Primary Examiner*—William Korzuch
*Assistant Examiner*—Nathan Danielsen
(74) *Attorney, Agent, or Firm*—Michael E. Belk

(57) ABSTRACT

A method for controlling writing on a data carrier device, at least including: writing data on the data carrier device with a data writer device; obtaining a tracking error signal corresponding to a position of the data writer device with respect to a track on the data carrier device; if the tracking error signal is below a predetermined tracking error value: bringing the data writer device to a non-writing state; and if the writer device is in the non-writing state and the tracking error signal is above predetermined tracking error value: bringing the data writer device to a writing state in which the data writer device writes data to the data carrier device.

18 Claims, 5 Drawing Sheets

U.S. PATENT DOCUMENTS

Figure 1:
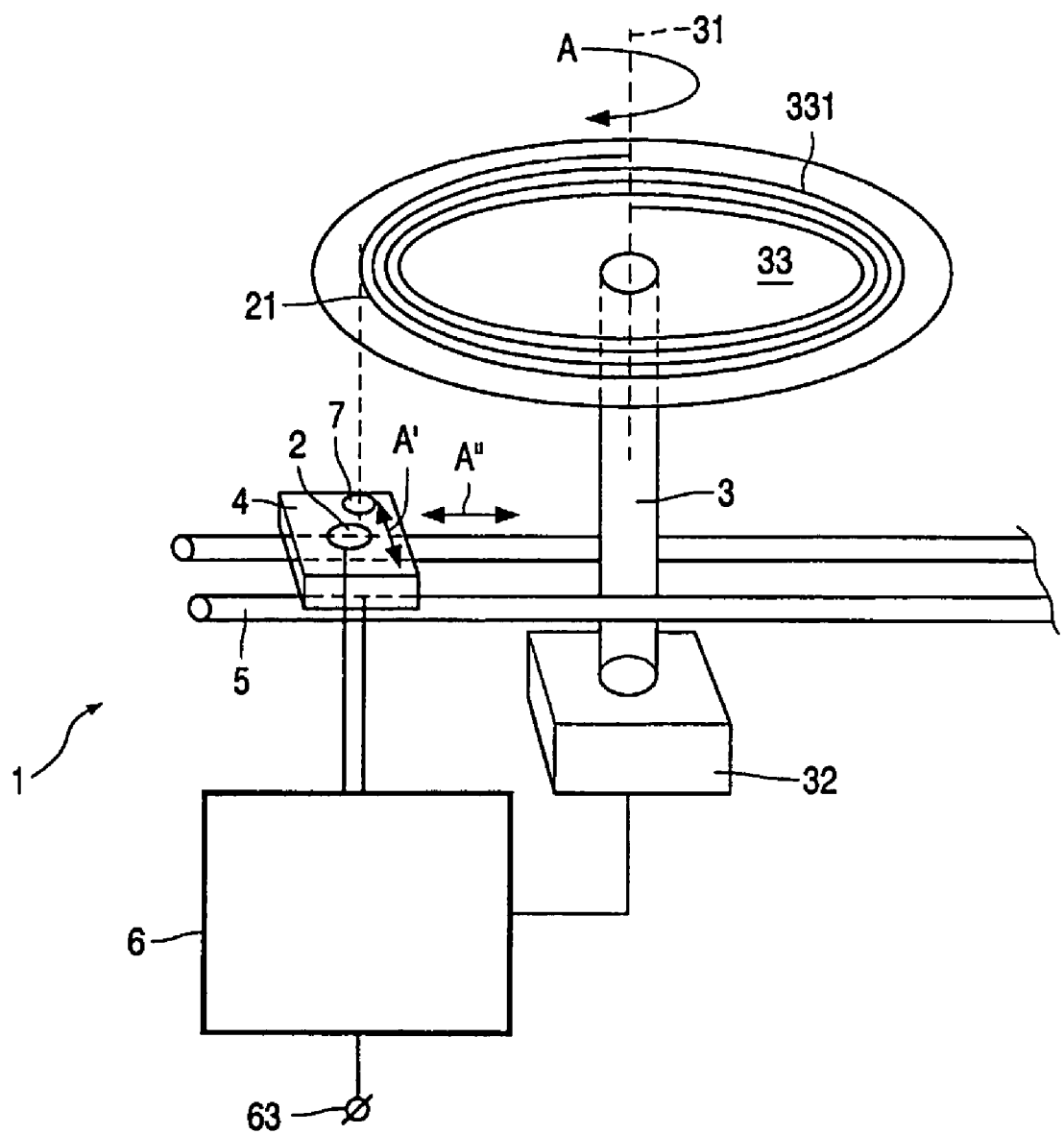

| | | | |
|---|---|---|---|
| 5,867,463 A * | 2/1999 | Chiba | 369/53.35 |
| 5,878,014 A * | 3/1999 | Hoeven | 369/53.22 |
| 6,172,952 B1 * | 1/2001 | Inokuchi et al. | 369/44.32 |
| 6,215,608 B1 * | 4/2001 | Serrano et al. | 360/60 |
| 6,229,775 B1 * | 5/2001 | Park | 369/53.37 |
| 2001/0006499 A1 * | 7/2001 | Hayashi et al. | 369/47.34 |

FOREIGN PATENT DOCUMENTS

| | | | |
|---|---|---|---|
| EP | 326343 A | * | 8/1989 |
| JP | 61139984 A | * | 6/1986 |
| JP | 63061423 A | * | 3/1988 |
| WO | WO 0133561 A1 | * | 5/2001 |

* cited by examiner

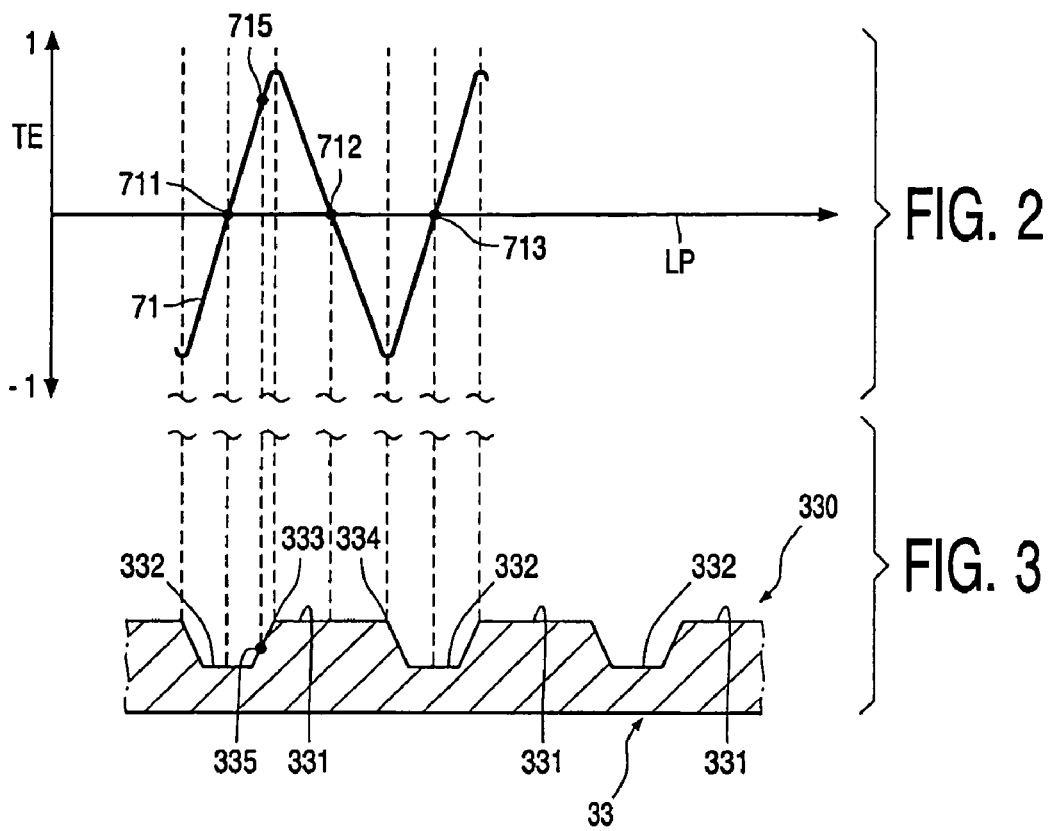
FIG. 2
FIG. 3
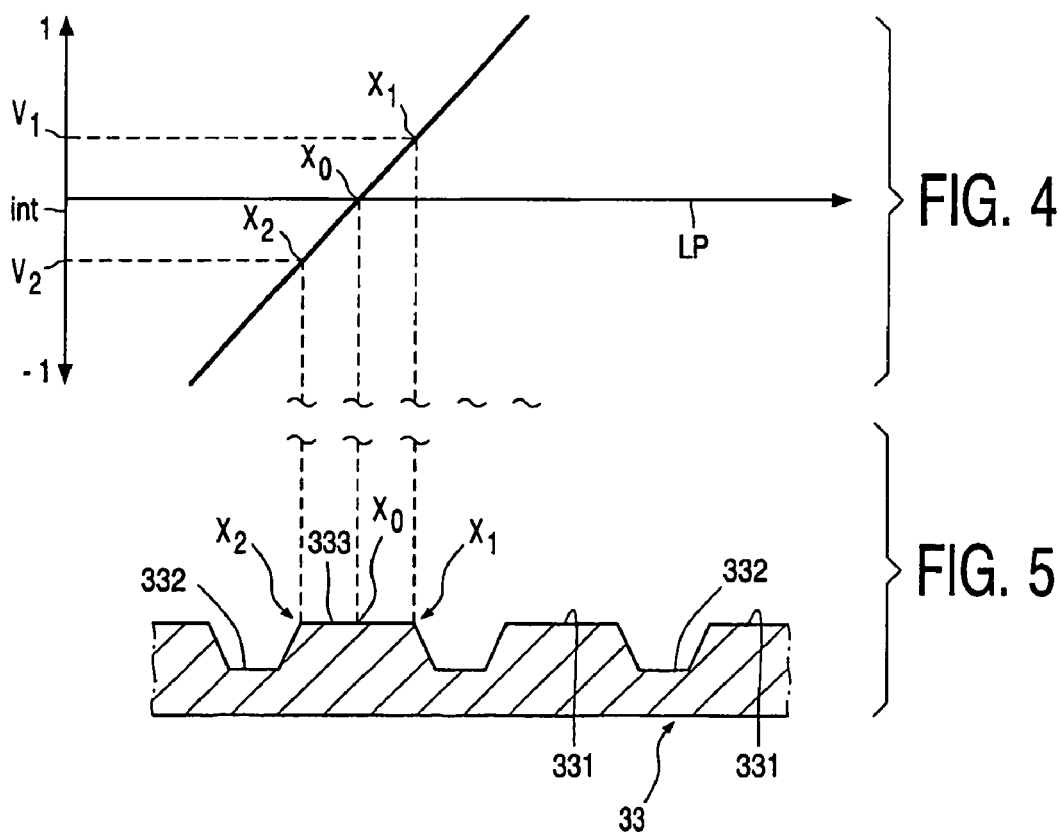
FIG. 4
FIG. 5

WRITE CONTROL IN RESPONSE TO TRACKING ERROR

The invention relates to a method for controlling the writing of data on a data carrier device. The invention further relates to a data recorder device, a computer program and a controller device for performing such a method. Furthermore, the invention relates to a data carrier device containing data written thereon using such a method.

It is known in the art to control the writing of data on a data carrier device, such as a compact disk or a computer harddisk, by switching a writer device, like a laser, off if the amplitude of a tracking error signal exceeds some predetermined tracking error value. Thus, if the writer device is moved with respect to the disk, for example by an external shock, the writing is stopped so a neighboring track will not be overwritten. After switching the writer device off, the writer device is repositioned to a correct position and the laser is switched back to writing level. This repositioning of the writer device with respect to the data carrier device may for example be performed by using the ATIP channel of a rewritable compact disk.

However, a problem of the known control method is that repositioning the data writer device is rather time consuming. Especially in systems which are sensitive to dust and scratches on the data carrier, such as digital versatile disk recorder devices, the tracking error signal will frequently exceed a predetermined threshold and the writer device will be switched off relatively often. The corresponding repositioning steps will cause the writing process to take a long time period and result in large sections of unwritten tracks. It is a goal of the invention to solve, or at least reduce this problem.

Therefore, according to an embodiment, a method for controlling writing on an data carrier device is provided, at least including the steps of: writing data on said data carrier device using a data writer device; obtaining a tracking error signal corresponding to a position of said data writer device with respect to a track on said data carrier device; continuously comparing said tracking error signal to a predetermined tracking error value and if said tracking error signal exceeds a predetermined tracking error value: bringing said data writer device to a non-writing state; and if said writer device is in said non-writing state and said tracking error signal is below above said predetermined tracking error value: bringing said data writer device to a writing state in which said data writer device writes data to said data carrier device.

Because the writer device is brought in the non-writing state if the tracking error signal is above the predetermined tracking error value and the writer device is brought into the writing state whenever the tracking error signal is below the predetermined tracking error value, no time is spent on repositioning the writer device. Furthermore, in most data recorder devices a tracking error signal is already available for the control of actuators which position the writer device with respect to the disk. In such cases no extra sensor devices are required to obtain this signal.

It is noted that continuously comparing as used herein also includes semi continuously comparing, that is periodically comparing with a suitable high frequency.

Often, the writer device will be switched to the non-writing state due to dust or scratches and the like on the data carrier device. Thus, the writer device will still be correctly positioned with respect to the data carrier device and the writer device will not be writing at the wrong position. However, within another embodiment extra measures are taken to prevent writing at the wrong position. In said embodiment, a method as described above further includes: obtaining a writer displacement signal corresponding to a current position of said data writer device with respect to an initial position of said data writer device; and if said writer displacement signal is above a predetermined displacement value: switching said data writer device to said non-writing state. Thus a second signal relating to the displacement of the writer device is used to control the writer device too and if the writer device is displaced too much, the writer device is switched to the non-writing state.

Another embodiment provides a data recorder device at least including: a data writer device a data carrier device holder for holding a data carrier device, said data writer device and said data carrier device holder being movable with respect to each other; at least one actuator device connected to at least one of said data writer device and said data carrier device holder for moving said device and said holder with respect to each other and; a controller device for controlling at least the operation of said data writer device said controller device being arranged, for performing a method.

In such a data recorder device a method according to the embodiment may automatically be performed. Furthermore, such a data recorder device is able to write data on the data carrier device very fast.

Also, a computer program including code portions for performing steps of a method according to another embodiment and a data carrier device including data representing such a computer program are provided. Such a program might be used in a processor controlling the writing process.

Furthermore, another embodiment provides a controller device including at least one electronic circuit for performing steps of the method. Such a controller device may be implemented in a data recorder device, whereby the process writing of data on a data carrier in the data recorder device is improved, because the process will be faster then previously possible and more accurate.

Furthermore, a data carrier device is provided, containing data written thereon using a method according to another embodiment. Such a data carrier will contain only a few or even no erroneous data, because of the improved writing process. Such a data carrier device may for example be a compact disk or a digital versatile disk.

Specific embodiments are set forth in the dependent claims. Further details, aspects and embodiments will be described below with reference to the figures in the attached drawing.

FIG. 1 schematically shows an example of an embodiment of a data recorder device in which a method may be applied.

FIG. 2 shows a graph of a tracking error signal

FIG. 3 schematically shows a side-cutaway view of a portion of an optical disk.

FIG. 4 shows a graph of an integral value of a PID controller as a function of a writer device position.

Figure 6:
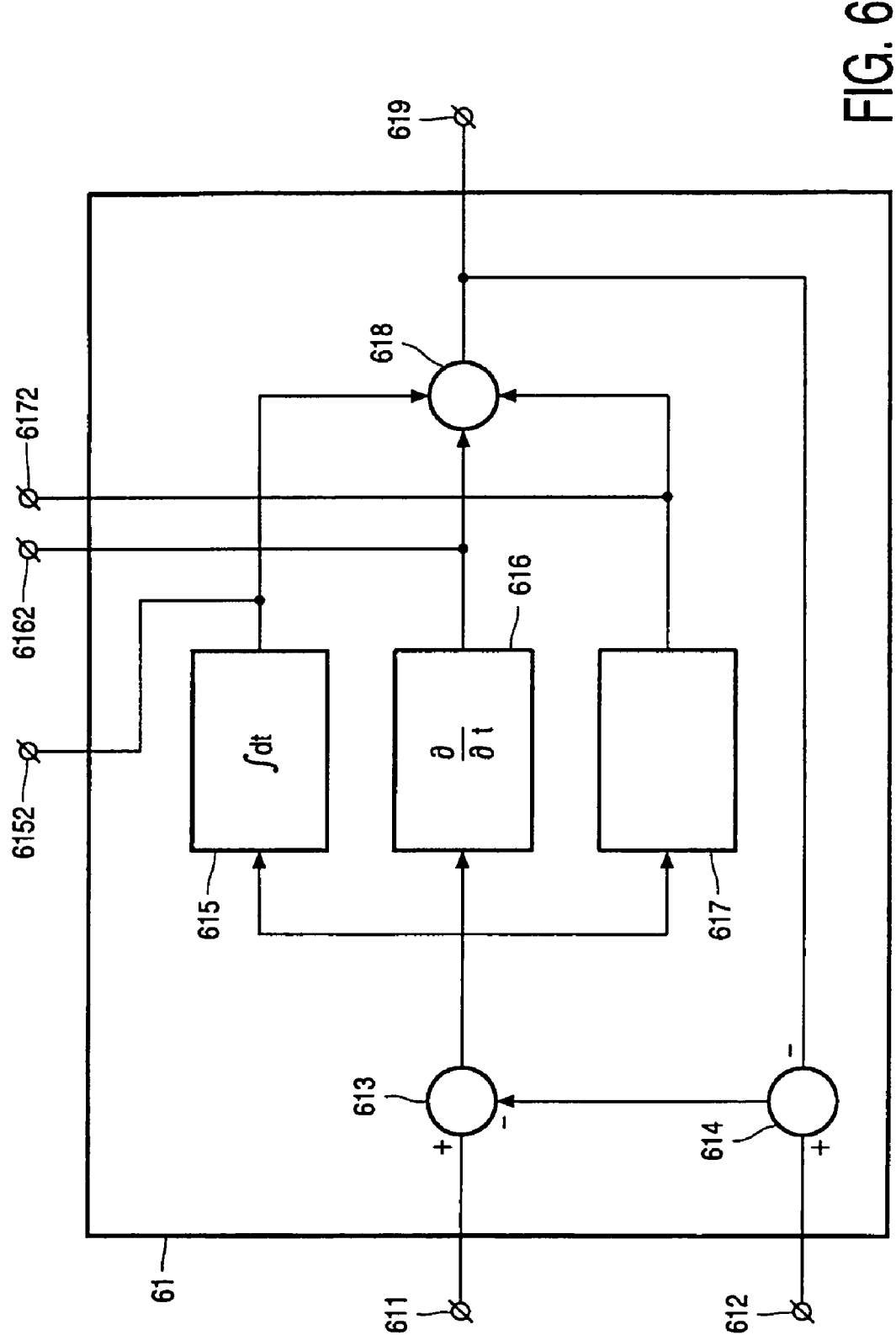
Figure 7:
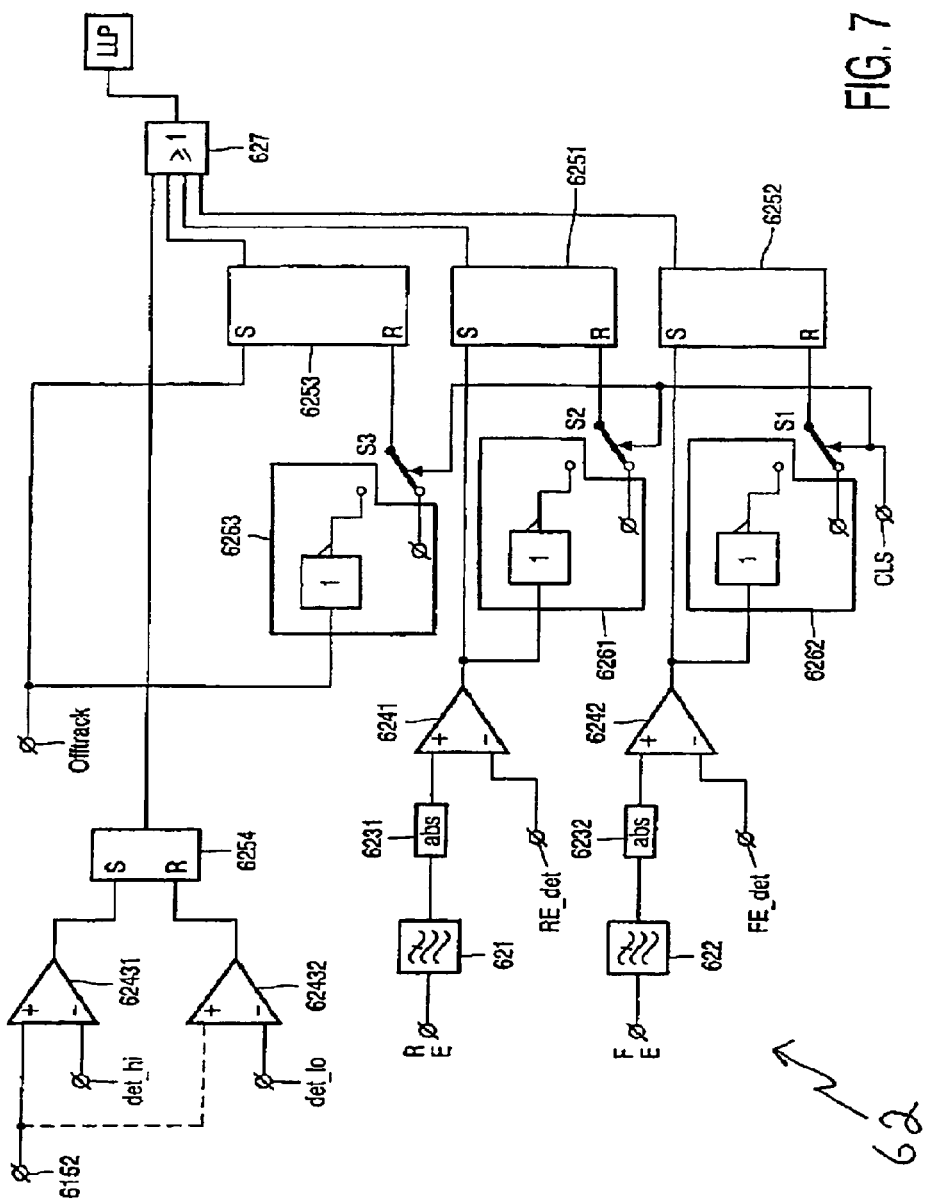

FIG. 5 schematically shows a side-cutaway view of a portion of an optical disk FIG. 6 shows a block diagram of a PID controller FIG. 7 shows a block diagram of a control circuit for controlling a state of a writer device.

Figure 8:
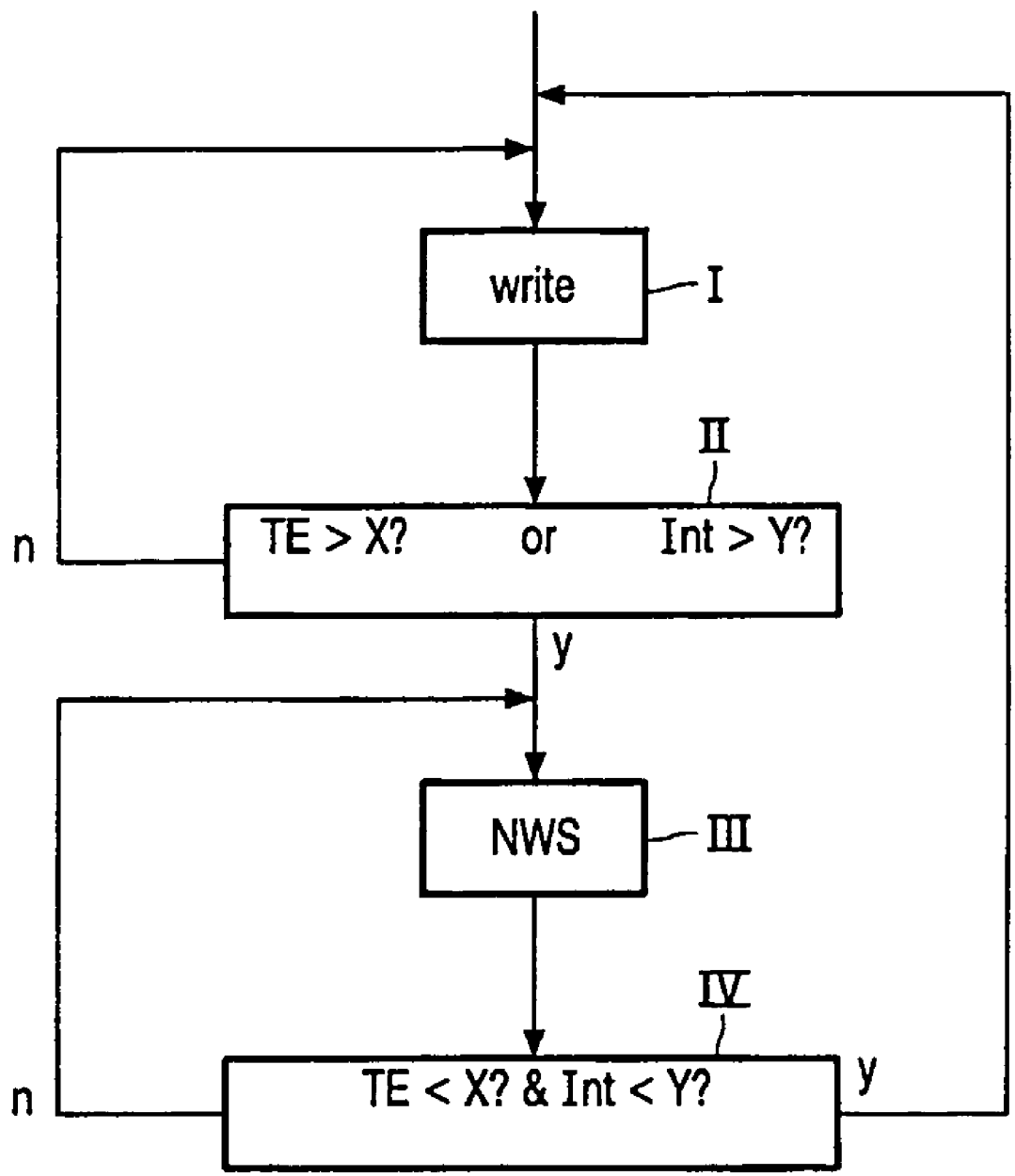

FIG. 8 shows a flow-chart of an example of an embodiment of a method for controlling writing on a data carrier device.

FIG. 1 schematically shows an example of an embodiment of a data recorder device 1. The shown data recorder device 1 is an optical recorder device, for example a compact disk recorder or a digital versatile disk recorder. The optical disk recorder device 1 comprises a writer device 2 and a data carrier holder 3, which are movable with respect to each other as indicated by arrows A,A',A". The data carrier holder holds the data carrier device in position with respect to the writer device 2. In FIG. 1, the data carrier device is an optical disk 33.

The data carrier holder 3 may be rotated by a motor 32 about an imaginary axis 31, as indicated in FIG. 1 by arrow A. The writer device 2 is mounted on a sledge 4 and movable with respect thereto in the directions indicated by arrow A'. The sledge 4 is movable in the directions indicated by arrow A" by sliding the sledge over gliders 5. The movement of the writer device and the sledge is driven by one or more suitable actuators, for instance electro motors not shown in the drawing.

The writer device 2, the sledge 4 and the motor 32 are connected to a control circuit 6, which may be connected to other devices and/or circuits inside or outside the data recorder device via a control terminal 63. The control circuit 6 may perform various functions. One of these functions is control of the writing of data on the optical disk 33. Other functions may for example be control of the rotational speed of the motor 32 and optical disk 33, control of an actuator which moves the sledge or the writer device and processing of signals received from or sent to the writer device. In FIG. 1, the control circuit 6 is depicted as a single device, however the device may physically be distributed over separate devices.

The optical disk 33 has grooves forming a number servotracks 331. Data may be written and read from bit positions on the servotrack 331 using the writer device 2. By rotating the holder 3 the optical disk 33 will be rotated with respect to the writer device 2. The writer device 2 may be moved in a radial direction with respect to the imaginary axis 31 by moving the writer device 2 with respect to the sledge 4 and/or moving the sledge 4 along the gliders 5. Thus, data may be written with the writer device 2 all over the tracks 331 of the optical disk 33.

In the shown example, the writer device 2 comprises a laser beam indicated in FIG. 1 by dotted line 21. The laser beam 21 is generated by a laser source and focused on the optical disk 33 by an objective lens. The source and lens are part of the writer device 2 and are not shown in FIG. 1. In a writing state the writer device 2 writes or erases data on servo tracks 331. In the writing state the laser beam 21 is switched to a high, or write intensity level. While the high intensity laser beam is applied to servo tracks 331, a magnetic bias field having an appropriate write or erase polarity, respectively, is applied to the bit position. Digital information is thereby generated and stored as a function of the induced magnetic orientation of the bit positions.

In a non-writing state of the writer device 2, the laser beam 21 is switched to a low or read intensity level suitable for reading information from bit positions on optical disk 33. After being focused onto servo tracks 331, the polarisation angle of the read intensity laser beam is modulated as a function of the magnetic orientation of the bit positions. The modulated beam is reflected from the optical disk 33 and directed to a detector 7.

The detector 7 may be of any type known in the art, such as one or more photoelectric diodes. The detector provides the read data as well as a signal indicative of the position of the writer device with respect to a servotrack of the optical disk. Said signal may be a return signal returned from the data carrier device in response to a signal sent by the writer device to the data carrier device. This may for example be a tracking error, which is obtained from the laser light reflected from the optical disk back to the writer device.

In most recorder devices a tracking error signal is already available and is processed by the servo systems to generate tracking drive signals. The tracking drive signal is usually applied to respective actuators or motors that cause the writer device to be driven to a position that minimises the tracking error. As the objective lens deviates further from the centre of the track, the tracking error signal increases in amplitude.

Obtaining a return signal and a tracking error signal is generally known in the art. For example the U.S. Pat. No. 5,710,748 describes a method for obtaining a tracking error signal using photodiodes and adding and subtracting the electric signals from the photodiodes. However, the invention is not limited to the implementation described in the '748 publication and any method and/or device for obtaining a signal corresponding to a position of said data writer device with respect to a track on said data carrier device may be used.

FIG. 2 illustrates an example of a tracking error signal. FIG. 3 illustrates a partial cross-section of optical disk 33. Taken together, FIGS. 2 and 3 illustrate the relationship between a tracking error signal 71 and the position of the writer device with respect to a servotrack 331. Optical disk 33 has an non-planar surface 330 including grooves 332 and land portions 331. Depending on the specific implementation, data is either written on the land portions or in the grooves of the optical disk 33. The parts of the disk data may be written on are synonymous with the servotracks 331. In the shown example, the landportions are the servotracks 331. In the shown example, the servo tracks 331 are actually a single, spirally-positioned track. Alternatively, as is known for example from magnetic hard disk drives, the servo tracks 331 might be implemented as a plurality of concentrically positioned tracks.

Referring to FIGS. 2 and 3, the tracking error signal 71 varies according to the position of the laser beam relative to the lands 331. When the laser beam is positioned at the centre of either a land portion 331 or a groove 332, the amplitude of the tracking error signal 71 is zero. For example, when the laser beam is at the centre of one groove 332, the tracking error signal 71 is at point 711. When the laser beam is at the centre of a neighbouring groove 332 the tracking error signal 71 is at point 713. The point of zero crossing 712 between these two points indicates that the laser beam 21 is at the centre of a land. When the position of the laser beam 21 varies between a groove 332 and land portion 331, the amplitude of the tracking error signal 71 increases or decreases to a maximum positive or maximum negative value. For example, when the position of the laser beam 21 transitions from a groove 332 and reaches a land portion 331, as shown at point 333, the tracking error signal 71 increases to its maximum positive value. Likewise, when the position of the beam 21 crosses a land portion 331 and reaches a groove 332, as shown at point 334, the tracking error signal 71 decreases to its maximum negative value. Thus, the tracking error signal 71 indicates the physical position of focused laser beam 21 relative to lands 331 and grooves 332. More specifically, the tracking error signal 71 represents the relationship between the distance from the centre of a land 331 (distance off track) as a portion of total track pitch.

In conventional optical disk drive systems, when the tracking error signal amplitude exceeds a predetermined fixed threshold level, the objective lens is considered to be sufficiently "off track" to stop all write and erase operations to avoid operating on an incorrect track. Thus, the writer device is switched to the non-writing state if the tracking error signal exceeds a predetermined value. After switching off, the position of the writer just before the moment of switching to the non-writing state is sought and the writer is switched back to the writing state.

In the proposed method the tracking error signal is just used for controlling the state of the writer device. When the tracking error exceeds a predetermined tracking error value, the laser is switched off, and if the tracking error signal is below this predetermined tracking error value, the laser is brought in the writing state, without first seeking the position of the writer device (the laser spot) on the data carrier at the moment of switching the writer device in the non-writing state. Thereby, the writing process is faster than in the known devices and avoids the occurrence of large unwritten track sections. Especially in digital versatile disk systems, the tracking error signal is extremely sensitive to dust and irregularities on the disk surface. Seeking the original position each time after switching the writer device to the non-writing state thus results in a slow writing process, while the writer device often was still in the correct tracking and the seeking was unnecessary. The predetermined tracking error value may be set for example such that the writer device is brought in the non-writing position if the laser is at a slope between the land and groove, as indicated in FIG. 3 as an example by point 335.

Besides a signal corresponding to the position of the writer device with respect to the data carrier device, a writer displacement signal corresponding to a current position of the writer device with respect to an initial position may be used to control the state of the writer device. The displacement signal may for example be obtained from an integrator section of a proportional-integral-differential (PID) controller.

PID controllers are generally known in the art, and have been disclosed in for example U.S. Pat. No. 4,390,942 and U.S. Pat. No. 5,325,288, and in European Patent publications 334 476 and 533 148. In general, a PID controller outputs a signal based on the difference between an input signal and a reference signal, the integral over time of this difference and the derivative with respect to time of this difference.

The output of the PID controller may be added to or subtracted from the input signal and the resulting signal may be used as the input signal, thus resulting in a feedback system.

FIG. 6 shows a block diagram of an example of a PID controller 61. The PID controller may logically be regarded as a part of the control circuit 6. The PID controller 6 has an input contact 612 and a reference contact 611. At the input contact 612 an input signal from a sensor device may be received. The reference contact 611 may receive a reference signal. The input contact 612 and the reference contact are connected to a subtractor device 613. For the moment disregarding subtracter device 614, the input signal and the reference signal are subtracted by the subtractor device 613, whereby an error signal is obtained which indicates a difference between the input signal and the reference signal. The error signal is presented to a proportional amplifier circuit 617, an integrator circuit 615 and a differentiator circuit 616 connected to the subtractor device 613. The circuits 615-617 respectively perform the integral, differential and proportional operations of the PID. Via output contacts 6152,6162,6172 the signal of the circuits 615-617 may be transmitted further to other devices. The signals of the circuits 615-617 are combined by a combinator 618, resulting in an output signal. Connected to the combinator 618 is an output contact 619. Via the output contact 619 the output signal may be transmitted further, for example to an actuator device which moves the writer device with respect to the sledge. The output signal is further fed back to the input contact 612 via a subtractor device 614 connected to the combinator device 618. The subtractor device 614 subtracts the output signal from the input signal, thus resulting in a negative feedback system. The invention is not limited to the shown PID controller. Any PID controller may be used.

In most data recorder devices a PID controller is already available in the control system of the actuator which positions the writer device. Usually, the PID controller receives an input signal from a sensor device. This input signal corresponds to a current position of the writer device with respect to an initial position. In the shown example, this may be the current position of the writer device on the sledge with respect to an initial position. The PID controller determines a difference between this input signal and a reference signal which corresponds to said initial position.

Referring to FIGS. 4 and 5, there is shown the integral value of the position signal taken from contact 6152 in FIG. 6, as a function of the writer device position LP. Initially, the writer device position was in the middle of the track at point X0. When the writer device is at this initial position X0 the integral value is zero. When the position of the writer device is displaced with respect to the initial position X0 the integral value increases. At the edges of the track, in the points X1,X2 the integral signal has amplitudes V1,V2 respectively. The writer device may be switched to the non-writing state if the writer position has changed too much and the position signal is below value V2 or above value V1. It is also possible to use different values for switching the writer device into the non-writing state, for example a lower value for V1 and a less negative value for V2 may be used. Thereby, a more accurate writing control is obtained because accidental writing at a wrong position on the data carrier due to hysteresis in the movement and signal of the writer device is prevented. Furthermore in that case, the writer device is brought back into the writing state when the writer device is more centered with respect to the servotracks, thus resulting in less write errors. It should be noted, that in FIG. 4 the integral value is linearly dependent on the writer device position. Other types of dependency may be obtained depending on the specific implementation. The invention is not limited to the shown specific linear relationship.

Reversely the writer device will stay in the writing state as long as the position signal is between V2 and V1.

FIG. 7 shows a block diagram of an electronic circuit 62 which is able to determine an error condition of the writer device and controlling the writer device. The circuit 62 includes a radial error input or tracking error input RE and a focus error input FE as known from the prior art relating to CDRW systems. The focus error input FEW may obtain a focus error signal obtained for example as described in the mentioned U.S. Pat. No. 5,710,748 publication. Both inputs are connected to low pass a filter 621,622 resp. Each of the filters 621,622 is connected to a device which outputs the absolute value of the amplitude of the filtered input signal, which device in the shown example is a rectifier device 6231 resp. 6232. Each of the rectifier devices 6231,6232 is connected to an opamp or comparator 6241,6242. Each of the opamps compares the respective input signal with a reference signal. The opamp 6241 connected to the radial error input or tracking error input RE compares the tracking error signal (which is also known in the art as the radial error signal) with a tracking error detection level RE_det which is presented at the negative input of the opamp 6241. The opamp 6242 compares the focus error signal with a focus error detection level FE_det. When the absolute value of the input signal is below the respective reference level a negative output signal is produced by the opamp. When the input signal is above this reference level a positive output signal is produced by the opamp. Each of the opamps 6241,6242 is connected to the set input S of an edge triggered bistable or flipflop device 6251,6252, resp. and to an inverter 6261, 6262, resp. The inverter is connected to the reset input R of the flipflop. Thereby, the output of the flipflop turns to a binary one when the output of the opamps turns from negative to positive. If the output of the opamp turns to negative, a binary zero is outputted by the flipflop. Thus a tracking error or a focus error will result in a binary one at the corresponding flipflop output.

For determination of the displacement signal, two opamps 62431,62432 are connected with their positive input contacts to the output contact 6152 of the integrator circuit 615 of the PID controller of FIG. 6. The opamp 62431 compares the integrator value with a first predetermined displacement value "det_hi". The other opamp 62432 compares the integrator value with a second predetermined value "det_lo". The values "det-hi" and "det-lo" may correspond to V1 and V2 in FIG. 4. The outputs of the opamps are connected to a logic circuit 6254. This circuit outputs a binary one signal if the output of the opamp 62431 is positive. When the output of the opamp 62431 is negative and the output of the opamp 62432 is positive a binary one signal is provided also. When the output of both opamps is negative a binary zero signal is outputted by the circuit 6254. The circuit 62 further has an off-track input "off-track". At this input an offtrack signal is presented, which is zero if the writer device is in the correct track and one if the writer device is in the wrong servotrack. The offtrack input is connected to the set input of a flipflop 6253 and to an inverter 6263. The flipflop 6253 operates in the same manner as the flipflops 6251 and 6252.

Furthermore, the flipflops 6251-6253 are connected to an all clear contact "cls" at which a signal may be presented by a controller device for resetting the outputs of the flipflops to zero. In the shown embodiment the "cls" signal controls switches s1, s2 and s3, respectively, which may connect the inputs of inverters 6261, 6262 and 6263, respectively, to the reset inputs of flipflops 6251, 6252 and 6253, respectively. The inputs of said inverters are connected to the outputs of opamps 6241 and 6242 and the offtrack signal, respectively. The outputs of the flipflops 6251-6253 and the logic circuit 6254 are connected to an OR port 627. The OR port outputs a binary one signal if at least one of its inputs has a binary one signal. The output signal of the OR gate is transmitted via an output contact LLP (low laser power) to a switch (not shown) that controls the writer device. Thus, the circuit 62 is able to control the state of the writer device. As soon as one of the input signal of the OR gate is a binary one, the writer device will be switched to a low power (non-writing) state. The OR gate then inhibits switching of the writer device into the writing state. However, as soon as all input signals are zero again the LLP signal will become zero too and the writer will be switched to the writing state again. Thus a temporary tracking or focus error will cause only a short write interruption if the writer device is still in a correct position.

The example described above is an optical disk drive, however the invention may likewise be applied to a magnetic recorder device such as a computer hard disk or floppy-disk drives.

FIG. 8 shows a flow-chart of an example of an embodiment of a method according to the invention. At a writing step I data is written by the writer device on the data carrier. In a comparison step II, a tracking error signal TE is compared to a predetermined tracking error value X and an integral value "Int" is compared to a predetermined displacement value Y. If at least one of the compared quantities exceeds the corresponding predetermined value, the writer device is switched to a non-writing state NWS in step II. When both quantities are below the predetermined value, the writing step I is performed again. After step III, both quantities are compared again in a step IV to the predetermined tracking error value X and the predetermined displacement value Y resp. When both quantities are below the value their compared with the writer device is switched into the writing state and the writing step I is resumed. Else, the writer device stays in the non-writing state and the steps III and IV are performed again.

The invention claimed is:

1. A method for controlling writing of data on a data carrier device, at least including the steps of:
   writing data on said data carrier device with a data writer device;
   determining a tracking error signal corresponding to a position of said data writer device with respect to a track on said data carrier device;
   determining a writer displacement signal corresponding to a current position of said data writer device with respect to an initial position of said data writer device;
   continuously comparing said tracking error signal to a predetermined tracking error value and if said tracking error signal exceeds said predetermined tracking error value:
   switching said data writer device to a non-writing state; and
   if said writer device is in said non-writing state and said tracking error signal is below said predetermined tracking error value:
   switching said data writer device to a writing state only if said writer displacement signal is below a first predetermined displacement value; and switching or keeping said data writer device in said non-writing state, if said writer displacement signal is above a second predetermined displacement value.

2. A method as claimed in claim 1 wherein the first and second predetermined displacement values are the same value.

3. A method as claimed in claim 1, wherein said tracking error signal is obtained from a return signal of said writer device, said return signal being returned from said data carrier device in response to a signal sent from said writer device to said data carrier device.

4. A method as claimed in claim 1, further including: determining a focus error signal and if said focus error signal exceeds a predetermined focus value: switching said data writer device in said non-writing state.

5. A method as claimed in claim 1, wherein said method is applied in a method of writing data on an optical data carrier device.

6. A method as claimed in claim 5, wherein a digital versatile disk is used as said optical data carrier device.

7. A computer readable storage medium encoded with a computer program including code portions for performing steps of a method as claimed in claim 1.

8. A controller device, including at least one electronic circuit for performing steps of a method as claimed in claim 1.

9. The method of claim 1, wherein a position of said data writer on said data carrier when switching to said non-writing state is maintained by said writer displacement signal.

10. A method as for controlling writing of data on a data carrier device, at least including the acts of:
    writing data on said data carrier device with a data writer device;
    determining a tracking error signal corresponding to a position of said data writer device with respect to a track on said data carrier device;
    determining a writer displacement signal corresponding to a current position of said data writer device with respect to an initial position of said data writer device;
    continuously comparing said tracking error signal to a predetermined tracking error value and if said tracking error signal exceeds said predetermined tracking error value:
    switching said data writer device to a non-writing state; and
    if said writer device is in said non-writing state and said tracking error signal is below said predetermined tracking error value:
    switching said data writer device to a writing state only if said writer displacement signal is below a first predetermined displacement value; and switching or keeping said data writer device in said non-writing state, if said writer displacement signal is above a second predetermined displacement value, wherein said writer displacement signal is an integrated signal obtained from an integrator section of a PID controller.

11. A data recorder device at least including: a data writer device, a data carrier device holder for holding a data carrier device, said data writer device and said data carrier device holder being movable with respect to each other; at least one actuator device connected to at least one of said the data writer device or the data carrier device holder for moving said writer device and said carrier device holder with respect to each other; and a controller device for controlling at least the operation of said data writer device, said controller device being arranged for:
    writing data on said data carrier device with a data writer device;
    determining a tracking error signal corresponding to a position of said data writer device with respect to a track on said data carrier device;
    determining a writer displacement signal corresponding to a current position of said data writer device with respect to an initial position of said data writer device;
    continuously comparing said tracking error signal to a predetermined tracking error value and if said tracking error signal exceeds said predetermined tracking error value: switching said data writer device to a non-writing state; and
    if said writer device is in said non-writing state and said tracking error signal is below said predetermined tracking error value:
    switching said data writer device to a writing state only if said writer displacement signal is below a first predetermined displacement value; and switching or keeping said data writer device in said non-writing state, if said writer displacement signal is above a second predetermined displacement value.

12. A data recorder device as claimed in claim 11, wherein said data recorder device is an optical data recorder device.

13. A data recorder device as claimed in claim 12, wherein said optical data carrier device is a digital versatile disk.

14. A data recorder device comprising:
    a data writer device;
    a data carrier device holder for holding a data carrier device, said data writer device and said data carrier device holder being movable with respect to each other; and
    a controller device including:
    means for detecting a tracking error of the data writer device and providing a corresponding tracking error signal;
    means for comparing said tracking error signal to a predetermined reference signal;
    means for detecting a writer displacement and determining whether said writer displacement exceeds predetermined limits, said writer displacement corresponding to a current position of said data writer device with respect to an initial position of said data writer device; and
    inhibit means for preventing said writer device from being switched into a writing state if said writer displacement does exceed at least one predetermined limit.

15. A data recorder device as claimed in claim 14 wherein said inhibit means include an OR gate.

16. A data recorder device a data writer device;
    a data carrier device holder for holding a data carrier device, said data writer device and said data carrier device holder being movable with respect to each other; and
    a controller device including:
    means for detecting a tracking error of the data writer device and providing a corresponding tracking error signal;
    means for comparing said tracking error signal to a predetermined reference signal;
    means for detecting a writer displacement and determining whether said writer displacement exceeds predetermined limits; and
    inhibit means for preventing said writer device from being switched into a writing state if said writer displacement does exceed at least one of said predetermined limits;
    wherein said means for detecting and determining the writer displacement includes an integrator section of a PID controller.

17. A method for controlling writing of data on a data carrier device, at least including the acts of:
    writing data on said data carrier device with a data writer device;
    determining a tracking error signal corresponding to a position of said data writer device with respect to a track on said data carrier device;
    determining a writer displacement signal corresponding to a current position of said data writer device with respect to an initial position of said data writer device;
    continuously comparing said tracking error signal to a predetermined tracking error value and if said tracking error signal exceeds said predetermined tracking error value:
    switching said data writer device to a non-writing state; and
    if said writer device is in said non-writing state and said tracking error signal is below said predetermined tracking error value:

switching said data writer device to a writing state only if said writer displacement signal is below a first predetermined displacement value; and switching or keeping said data writer device in said non-writing state, if said writer displacement signal is above a second predetermined displacement value, wherein switching said data writer device to said writing state occurs without seeking said data writer's position on said data carrier when switching said data writer to said non-writing state was performed.

18. A method for controlling writing of data on a data carrier device, at least including the acts of:

writing data on said data carrier device with a data writer device;

determining a tracking error signal corresponding to a position of said data writer device with respect to a track on said data carrier device;

determining a writer displacement signal corresponding to a current position of said data writer device with respect to an initial position of said data writer device;

continuously comparing said tracking error signal to a predetermined tracking error value and if said tracking error signal exceeds said predetermined tracking error value:

switching said data writer device to a non-writing state; and if said writer device is in said non-writing state and said tracking error signal is below said predetermined tracking error value:

switching said data writer device to a writing state only if said writer displacement signal is below a first predetermined displacement value; and switching or keeping said data writer device in said non-writing state, if said writer displacement signal is above a second predetermined displacement value, wherein switching said data writer device to said writing state occurs without using said data writer's position on said data carrier when said writer displacement signal is below the first predetermined displacement value.

* * * * *